W. J. ANDREWS.
Cultivator.
No. 62,386. Patented Feb. 26, 1867.
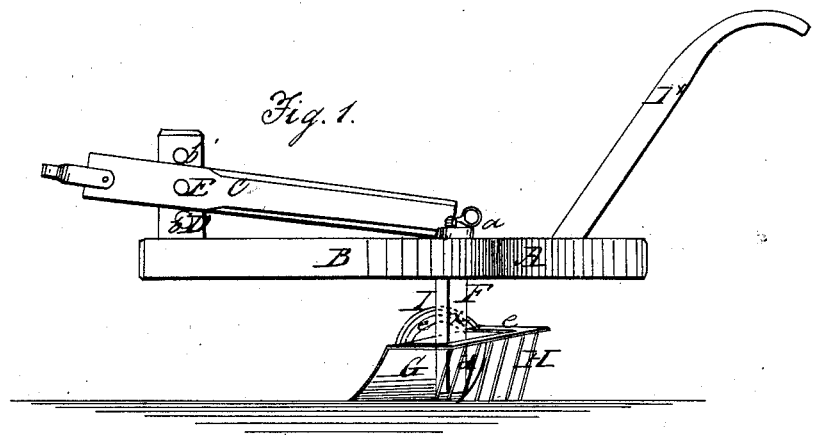
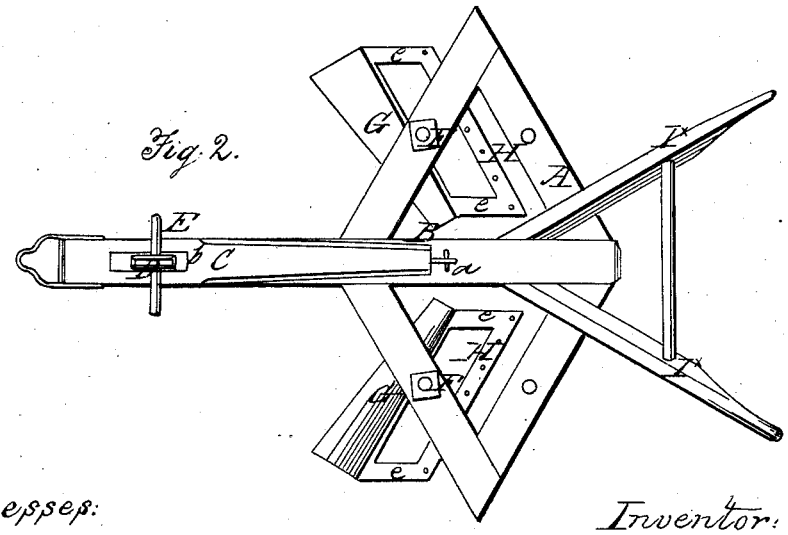
Witnesses:
Alex T. Roberts
J. A. Service
Inventor:
Wm. J. Andrews
per Munn & Co
Attorneys

United States Patent Office.

WILLIAM J. ANDREWS, OF COLUMBIA, TENNESSEE.

Letters Patent No. 62,386, dated February 26, 1867.

---

IMPROVEMENT IN CULTIVATORS.

---

The Schedule referred to in these Letters Patent and making part of the same.

---

TO ALL WHOM IT MAY CONCERN:

Be it known that I, WILLIAM J. ANDREWS, of Columbia, in the county of Maury, and State of Tennessee, have invented a new and improved Cultivator; and I do hereby declare that the following is a full, clear, and exact description thereof, which will enable others skilled in the art to make and use the same, reference being had to the accompanying drawings, forming part of this specification, in which—

Figure 1 is a side view of my invention.

Figure 2, a plan or top view of the same.

Similar letters of reference indicate like parts.

This invention relates to a new and improved cultivator, of that class designed for cultivating crops grown in hills or drills, and it consists of a novel draught attachment for regulating the depth of the penetration of the ploughs, as may be desired, and in a novel arrangement and application of ploughs and harrows for pulverizing and rendering the earth light and pliable.

A represents the frame of the machine, which is of lozenge form, and has a draught-pole, B, centrally framed into it, as shown clearly in fig. 2. C is a draught-bar, the rear end of which is attached by a joint, a, to the rear part of the draught-pole. The front part of this draught-bar has a mortise, b, made vertically through it for an upright, D, on the front end of the draught-pole, to pass through, said upright being perforated with holes, b, and the draught-bar C also having a hole made horizontally through it, through which and any one of the holes in the upright D a pin, E, passes. By this arrangement the front end of the draught-bar may be adjusted at a greater or less height, as desired. The team or draught animal is attached to the front end of the draught-bar C, and, consequently, it will be seen, by adjusting the front end of the draught-bar C the ploughs may be made to work at a greater or less depth in the soil, as may be required. To the front part of the frame A there are attached two standards, F F, to each of which a plough, G, and harrow, H, are attached. These ploughs are of scraper form, and have a slotted segment-bar, I, attached to their upper ends, through which and the standards F screw-bolts, c, pass. The ploughs are attached by pivot-bolts, d, to the standards F F, said pivot-bolts being at the centre of a circle, of which the bars I are a part, and it will be seen that by loosening the nuts of the bolts c, the ploughs G may be adjusted in a horizontal or inclined position, and secured firmly by screwing up the nuts of the bolts c. The harrows H are at the rear of the ploughs G, said harrows being attached to arms, e, which admit of their being a short distance behind the ploughs and parallel with them, as shown in both figures. From the above description it will be seen that the ploughs may, by a very simple adjustment of the draught-bar, be made to penetrate into the earth at a greater or less depth, as may be desired, and the ploughs and harrows also adjusted to work on a level or at a greater or less degree of inclination, as circumstances may require. The frame A has handles, I* I*, attached, arranged in the usual way.

What I claim as new, and desire to secure by Letters Patent, is—

The combined ploughs and harrows G H, applied to the standards F F, substantially as and for the purpose specified.

The above specification of my invention signed by me this      day of          , 1866.

WM. J. ANDREWS.

Witnesses:
   W. L. MURPHY,
   GEORGE FISHER.